(12) United States Patent
Hogan

(10) Patent No.: US 12,312,959 B2
(45) Date of Patent: May 27, 2025

(54) HYDRAULIC/PNEUMATIC POWER GENERATING SYSTEM

(71) Applicant: Joseph Hogan, Argyle, TX (US)

(72) Inventor: Joseph Hogan, Argyle, TX (US)

( * ) Notice: Subject to any disclaimer, the term of this patent is extended or adjusted under 35 U.S.C. 154(b) by 0 days.

(21) Appl. No.: 18/329,132

(22) Filed: Jun. 5, 2023

(65) Prior Publication Data

US 2024/0401481 A1    Dec. 5, 2024

(51) Int. Cl.
| | |
|---|---|
| *F01B 23/10* | (2006.01) |
| *B60K 6/12* | (2006.01) |
| *F01B 1/02* | (2006.01) |
| *F03G 7/08* | (2006.01) |
| *F15B 3/00* | (2006.01) |

(52) U.S. Cl.
CPC ............. *F01B 23/10* (2013.01); *F01B 1/02* (2013.01); *F15B 3/00* (2013.01); *B60K 2006/123* (2013.01); *F03G 7/08* (2013.01); *F03G 7/085* (2021.08)

(58) Field of Classification Search
CPC ...... B60K 2006/123; F01B 1/02; F01B 23/10; F03G 7/08; F03G 7/085; F15B 3/00
See application file for complete search history.

(56) References Cited

U.S. PATENT DOCUMENTS

| | | | | |
|---|---|---|---|---|
| 2,499,968 A | * | 3/1950 | Pfauser | ............... F15B 3/00 92/172 |
| 7,201,095 B2 | | 4/2007 | Hughey | |
| 7,841,432 B2 | * | 11/2010 | Lynn | ............... B60K 6/32 180/65.21 |
| 7,900,444 B1 | | 3/2011 | McBride et al. | |
| 8,117,842 B2 | | 2/2012 | McBride et al. | |
| 8,240,140 B2 | * | 8/2012 | McBride | ............... F15B 1/024 60/415 |
| 8,240,146 B1 | * | 8/2012 | Bollinger | ............... F01K 27/00 60/659 |
| 2010/0307156 A1 | * | 12/2010 | Bollinger | ............... H02J 15/006 60/682 |
| 2018/0086201 A1 | * | 3/2018 | Antrobus | ............... B60L 50/90 |
| 2022/0364507 A1 | * | 11/2022 | Lawson | ............... F01D 1/38 |

FOREIGN PATENT DOCUMENTS

| | | |
|---|---|---|
| DE | 202011108619 U1 | 1/2012 |
| DE | 102012023613 A1 | 6/2013 |
| RU | 2683349 C1 * | 3/2019 |

OTHER PUBLICATIONS

DE202011108619U1_t machine translation thereof (Year: 2012).*

* cited by examiner

*Primary Examiner* — Matthew Wiblin

(57) ABSTRACT

An electric power generating device includes a hydraulic power unit in fluid communication with hydraulic fluid and a hydraulic piston, the hydraulic piston creating compressed air to drive a pneumatic piston, the pneumatic piston driving a pneumatic motor, the pneumatic motor driving an electric generator/alternator. The electric power generating device can further include a canister air exchange comprising a small diameter pipe wrapped perpendicular inside a small section of larger pipe which creates a pressure induced spin movement to drive an electric generator/alternator.

3 Claims, 5 Drawing Sheets

HYDRAULIC/PNEUMATIC POWER GENERATING SYSTEM

BACKGROUND

Description of the Related Art

In an elevator, a hydraulic operator piston can push thousands of pounds of weight directly upwards against the force of gravity. In this particular setting, a piston can push air horizontal or vertical, with a regulated speed from a driveshaft which can create hundreds of pounds of air pressure. What has not been generally recognized, is that this air pressure can be used to do further work through, for example, a pneumatic motor including generating electrical power.

SUMMARY DISCLOSURE OF THE INVENTION

An electric power generating device includes a hydraulic power unit in fluid communication with hydraulic fluid and a hydraulic piston, the hydraulic piston creating compressed air to drive a pneumatic piston, the pneumatic piston driving a pneumatic motor, the pneumatic motor driving an electric generator/alternator. The electric power generating device can further include an canister air exchange comprising a small diameter pipe wrapped perpendicular inside a small section of larger pipe to create a pressure induced spin movement to drive an electric generator/alternator.

The present invention is based on the idea of using a small amount of voltage to operate an electric motorized hydraulic pump. The hydraulic pump may be a hydraulic pump similar to those used to operate elevators. The use of hydraulic pressure can be used to operate a pneumatic pump, which can in turn create extreme air pressure when forced out of a large pipe and into a smaller pipe or pipes. The air pressure can then be used to operate an air/impact motor.

In addition, the invention can use a "canister air exchange" which includes a small diameter pipe wrapped perpendicular inside a small section of larger pipe to create a pressure induced spin movement which assists in operating, or can itself operate, a permanent magnet generator/alternator. The electrical power created can then be sent to a storage battery or can charge a battery. Voltage from the generator can go through a voltage regulator to a motor, or any other designated area or device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DISCLOSURE OF THE INVENTION

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

MODES FOR CARRYING OUT THE INVENTION

The electric power generating system of the disclosure includes a hydraulic power unit, in embodiments similar to a hydraulic power system used in an elevator. The hydraulic power unit is connected to a hydraulic piston. The hydraulic piston is connected to a pneumatic piston which is further connected to a pneumatic motor. In embodiments, the hydraulic piston is of a smaller diameter than the pneumatic piston. This dual piston design with a smaller hydraulic piston power connected to a larger pneumatic piston is a key feature of the invention. The pneumatic motor can then be connected to a permanent magnet alternator/generator by way of a belt.

In addition, the electric power generating system can include a canister air exchange which includes a small diameter pipe wrapped perpendicular inside a small section of larger pipe to create a pressure induced spin movement and which either assists in operating, or can itself operate, a permanent magnet generator/alternator. The canister air exchange can thus be a separate embodiment (and used without a pneumatic motor) or it can be used in combination with a pneumatic motor as shown in FIG. 1.

Figure 1:
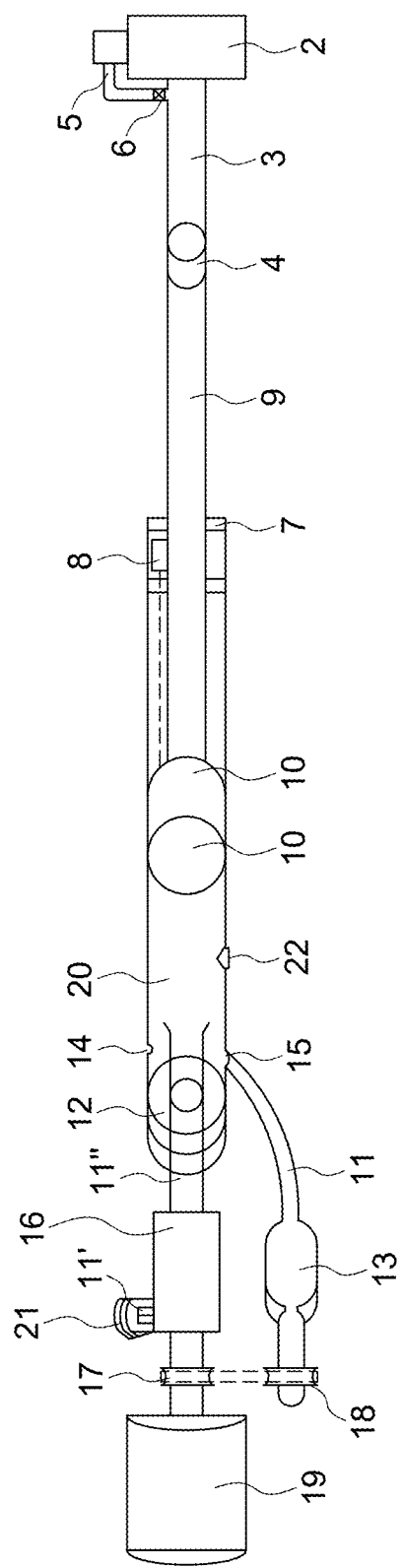
FIG. 1 shows a hydraulic pneumatic electric power generating system of the disclosure.

FIG. 1 shows a hydraulic pneumatic electric power generating system of the disclosure. FIG. 1 shows hydraulic power unit 2; hydraulic fluid 3; hydraulic piston 4; fluid pipe 5; two-way valve 6; Block spacer 7; coil reel 8; driveshaft 9; pneumatic piston air cylinder 10; airflow pipe(s) 11, 11', and 11"; ball bearing section 12; pneumatic motor 13; one way valve 14; one way valve 15; canister air exchange 16; belt 17; pulley 18; permanent magnet alternator/generator 19; air 20; muffler air diverter 21; and power switch 22.

In embodiments, the one-way valve 15 may be adjustable. Furthermore, there may be a plurality of pneumatic pistons and air cylinders.

The hydraulic pneumatic electric power generating device of FIG. 1 can be used to operate a permanent magnet alternator/generator, or the like. The number of driveshaft power units used can be varied depending on the size and location. Two or more may be appropriate in order to keep one or more moving consistently while another one or more is pulled back to base in order to reload with air and fluid. A recoil spring attached to the pneumatic piston can help return the driveshaft back to its starting position.

The inventive device and method when built on a larger scale for homes and small businesses would be valuable in areas where the national power grid is unreliable. This unreliability can be for various reasons, mostly weather-related, i.e., it is too hot, or too windy, or there is not enough wind or sunshine. Too much ice on high wires, tornadoes, hurricanes, or many other types of accidents that can shut down the local power grid either intentionally or terrorism-related both foreign and domestic.

An average elevator uses a relatively small amount of electrical power to operate a hydraulic pump, a few dollars per hour average, with a 10 hp motor, or less. The disclosed system can keep batteries charged on electric vehicles or operate motors directly. The batteries on the vehicles use a much smaller amount of electric power to operate the hydraulic pump that operates the hydraulic/pneumatic power system.

A variety of methods are included considering multiple size and weights of the electric vehicles. One of the many advantages of using the disclosed power system is the fact that operating a motor while driving requires less voltage than charging the battery. Good results can be obtained by sending voltage from a permanent magnet alternator/generator through a voltage regulator to the motor and controlled with an accelerator. This would save battery power for an emergency, or at times, needing a combination of power from both the generator and battery. As one example, going uphill while pulling a load against the wind. In this case, the disclosed power system would have great value. The system could charge the battery while the vehicle is not in use, sitting in traffic, or at a red light, or going downhill and can operate vehicles while also charging a battery at moderate speed.

The hydraulic pump could be used in unison with an accelerator. When voltage goes directly to the motor and the vehicle stops, the hydraulic pump should stop. The momentum of the driveshaft and the action of a generator will continue to produce a certain amount of voltage after the pump is stopped. When pressure is lifted from accelerating, the voltage could be rerouted with a relay switch to the battery to prevent wasting power.

As one example of a small battery use, one or more batteries could be built to slide in and plug in with female sections on the battery with male sections inside the designated slot where battery plug ends can be firmly connected with magnets, or the like. Batteries can be cushion wrapped to be fireproof, waterproof, and less apt to be damaged and minor collisions, and can be quickly replaced.

Using the small piston method with hydraulics on an elevator, a hydraulic elevator can easily move 5000 pounds straight up. A hydraulic piston with a 24-inch diameter pneumatic piston and a 16-foot driveshaft, operating with three units, in order for two units to be operating at the same time, while one unit reloads fluid and air. The disclosed system can thus be sized to power anything from a large generator on a boat to a small unit on a golf cart and anything in between.

Batteries used could be one quarter to one third the size of current batteries, for example, automotive batteries, which implies that three or four times the number of vehicle batteries can be built with the same amount of lithium which is scarce and expensive.

Essentially trading approximately one third of the weight from the typical 2 to 3000-pound battery for an approximately 70-pound permanent magnet alternator/generator of the present invention provides a lighter and less expensive vehicle.

In the present invention, batteries will last longer since the permanent magnet alternator/generator can assist in operating and powering the vehicle.

The present invention would provide a less expensive vehicle, require fewer stops at charging stations and will thus save time and money. Smaller batteries would be easier to charge, charging would be quicker, and less voltage would be needed. Best results for self-charging vehicles could be determined by terrain, condition of roads and driver, etc.

Furthermore, replacing the smaller batteries will be less expensive, saving time and money, reducing the need for charging stations and will result in used in electric vehicles having a greater resale value and encouraging owners to trade in and buy new vehicles more frequently.

Lighter vehicles will also provide brakes, tires, etc., that last longer and make stopping the vehicle quicker and easier thus providing a safer vehicle.

Less expensive electric vehicles would also help increase electric vehicle sales, overall costs would decrease and competition would increase.

Safety issues may also be resolved in certain electric vehicles with a smaller battery. Smaller batteries could be wrapped in a waterproof, flame resistant pocket, would be much easier to deploy than the large extremely heavy batteries currently in use.

Figure 2:
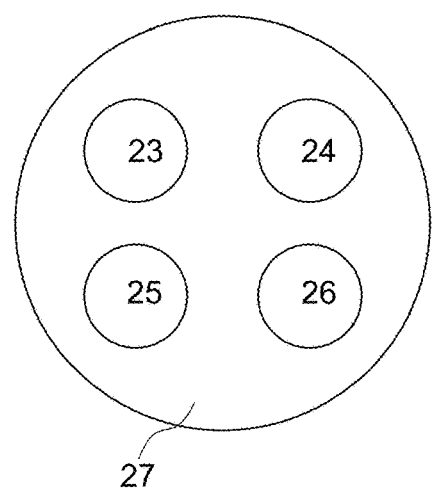
FIG. 2 shows an embodiment of a canister air exchange of the disclosure.
Figure 3:
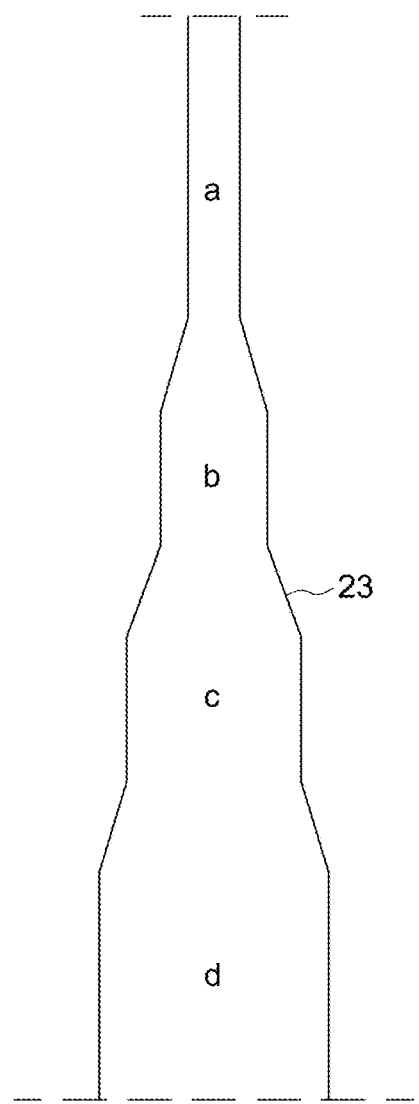
FIG. 3 shows an embodiment of an airflow pipe of the disclosure.

FIG. 2 shows an embodiment of an airflow canister of the disclosure. FIG. 3 shows canister airflow pipes 23, 24, 25, and 26 and airflow separator 27.

FIG. 3 shows an embodiment of an airflow pipe 23 of the disclosure. As an example, the diameter of each section a, b, c, and d may be: a=½"; b=1"; c=1½"; d=2". These are exemplary approximate dimensions.

Figure 4:
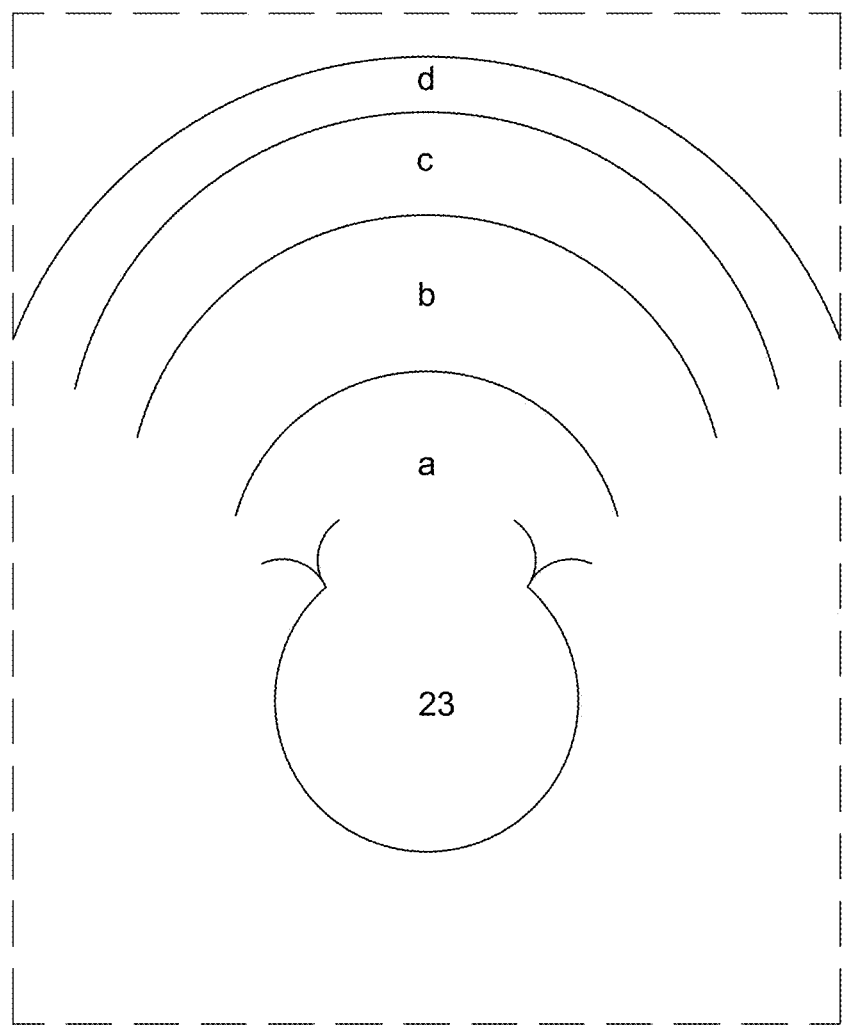
FIG. 4 shows another view of an airflow pipe.

FIG. 4 shows another view of airflow pipe 23.

Figure 5:
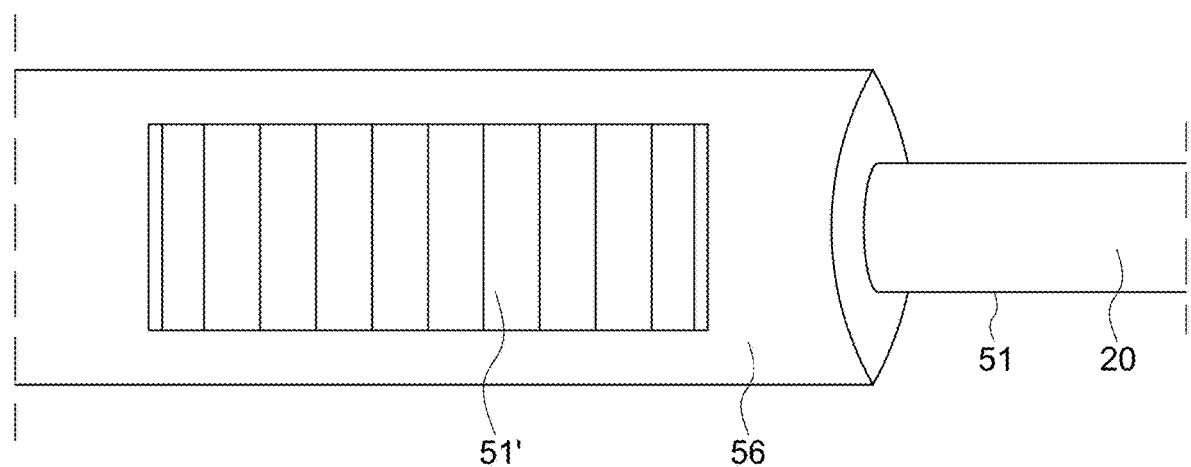
FIG. 5 shows another embodiment of a canister air exchange of the disclosure.

FIG. 5 shows another embodiment of an airflow canister 56 of the disclosure. FIG. 5 shows airflow pipe(s) 51 and 51' and air 20.

Figure 7:
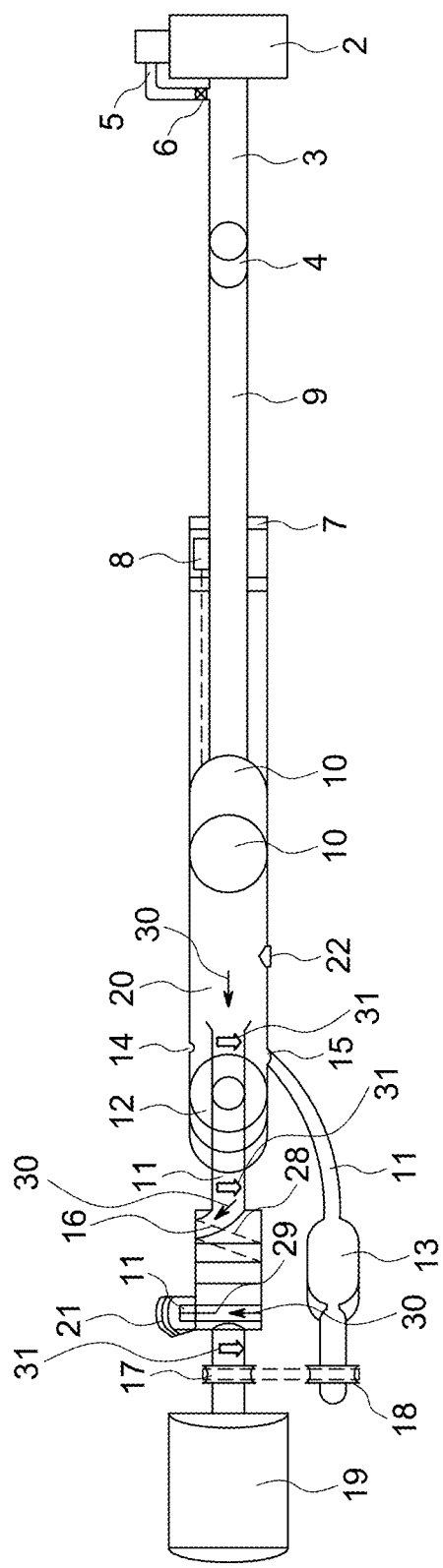
FIG. 7 shows a canister air exchange of the disclosure.

FIG. 7 shows a canister air exchange of the disclosure. The like reference numbers in FIG. 7 correspond with those in FIG. 1. FIG. 7 additionally shows arrows 30 which show the direction of airflow. FIG. 7 also shows arrows 31 which show the direction of spin of the canister air exchange. FIG. 7 further shows adjustable exit opening 28 and angled backside pipe 29.

In another embodiment, a group of vehicles can circle around a turbine and can pull trailers with several large units that connect to batteries or operate vehicle motors directly to generate more voltage. The vehicles can then turn a turbine without using any voltage from the turbine itself. The vehicle operated turbine unit would thus be less expensive to build. Vehicles using the disclosed system would have less voltage lost and be less accessible to vandals/terrorists and would have fewer weather-related problems. The vehicles that circle the turbine generator would have room for twin pumps that can operate vehicle motors and keep the battery charged. Furthermore, compared with offshore ocean turbines there would be fewer sea creatures and birds affected, it would be easier to find locations to build, would be less noisy, and would require less maintenance.

Accordingly, in embodiments, a vehicle turbine generator system includes a turbine generator, one or several moving vehicles comprising the disclosed hydraulic pneumatic electric power generating system each including a connector to the turbine generator, wherein the moving vehicles cause the turbine generator to generate electrical power. The vehicle may be a semitruck. The moving vehicles may move in an elliptical or circular path around the turbine generator. The vehicles may be on rails including banked rails. The turbine generator may be a wind turbine generator modified to be powered by moving vehicles with the vehicle connectors in place of the wind blades. In embodiments, the wind turbines may be horizontal axis wind turbines with the metal rod vehicle connectors in place of wind blades.

Figure 6:
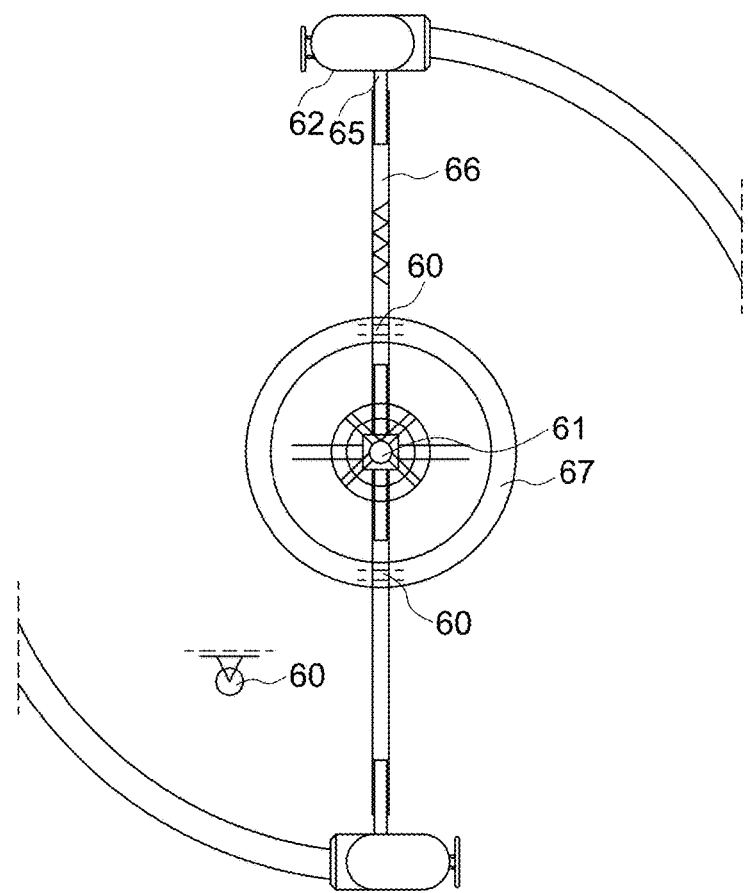
FIG. 6 shows an embodiment of a vehicle turbine system of the disclosure.

FIG. 6 shows an embodiment of a vehicle turbine system of the disclosure. FIG. 6 shows a permanent magnet turbine generator 61, vehicle 62 optionally on rails or banked rails, feeder leads or pipe connection to vehicle 65, wing brace-horizontal/vertical connector 66, weight support wheel 60, and smooth level surface 67.

GLOSSARY

Electric vehicles include large and small vehicles, e.g., passenger cars, sport utility vehicle (SUV), trucks, pickup trucks, for home and business use, motor homes, boats, buses, golf carts, etc. The location of the components on a vehicle can be determined by chassis style, location of the motor, how many motors, price, and complexity of the vehicle.

An hydraulic piston average diameter can be between about three and 8 inches. On a vehicle, a slim hydraulic piston may be used about 1½ inches. In order to create a greater volume of air and pressure, the pneumatic piston can be larger than the hydraulic piston. This is not required. Nevertheless, in embodiments, the pneumatic piston may be two or three times or more larger than the hydraulic piston. Each piston can be several inches in diameter. The thickness of the pipe would be determined by the amount of pressure being created and the size of the motor as well as the types of material used, location, size of the unit, etc.

Vehicles could be used on banked rails or road in order to prevent a roll over and balance pressure against riding surface. Operation of the vehicles can be by remote control, or fixed settings to automatically speed up when more voltage is needed, for example, under different weather conditions, etc. A strong material would be needed for the braces both vertical and horizontal to connect a large generator with vehicles. One or more wheels mounted between the vehicle and generator rolling on a smooth surface can take weight off of each end of a wing brace.

In embodiments, a vehicle frame could be used, with motors, axles, wheels, wiring, remote control system, and other minor components which would be a lighter, less expensive vehicle more wind resistant and would use less electricity per mile to operate. Such vehicles would be less expensive to build, more productive and less expensive to operate. They would also be more friendly to wildlife on and offshore and much safer from attack. A canister air exchange can also operate a generator with a belt, chain, gears, etc.

In a context where a large amount of electricity is needed, for example, a large apartment complex, multiple hydraulic/pneumatic pumps can be used. For example, these could be contained in a basement area where several units may work at the same time, for example, some working while others are springing back. This would produce a large amount of voltage and would be easier and less expensive than using larger components. In embodiments, several hydraulic/pneumatic pump units can be connected to one large generator, using belts, chains, tears, etc., while using air motors, canisters, or both together.

Rustproof materials may be preferred. All pipes may be galvanized, stainless steel, plastic, or the like. The driveshaft could be iron/steel with plastic coating. A hard plastic pneumatic piston can be used, leather edged or the like to help seal. A stainless steel hydraulic piston can be a good fit, coated to help seal and can work smoothly because of the hydraulic fluid acting as a lubricant.

A spiral perpendicular pipe of a canister air exchange can be in embodiments about 1 inch or less. The pipes, however, could be larger if a canister radius is large in space is not a problem. Adjustable or exchangeable caps can be threaded to be removed and replaced.

Hydraulic power units are usually self-contained systems that generally include a motor, a fluid reservoir, and a pump. It works to apply the hydraulic pressure needed to drive motors, cylinders, and other complementary parts of a hydraulic system. Hydraulic power units are readily commercially available in various sizes, particularly with respect to the size of the motor, to provide various power capacities. The hydraulic piston provides compressed air to a pneumatic piston. The hydraulic motor may include an accelerator.

In order to achieve linear motion from compressed air, a system of pneumatic pistons and air cylinders can be used. The compressed air is fed into an air-tight chamber or cylinder that houses the shaft of the piston. In one embodiment, inside the chamber a spring can be coiled around the shaft of the piston in order to hold the chamber open when air is not being pumped into the chamber. As air is pumped into the chamber by the hydraulic piston, the force on the piston shaft overcomes the force on the spring. When the piston reaches maximum length the air pressure is released from the chamber and the spring completes the cycle by closing off the chamber to return to its original position. The piston may also in embodiments be returned to position by gravity or other conventional means known in the art.

Permanent magnet generators as used herein are commercially available and can be obtained in various sizes ranging from, for example, 24 V to 380 V and various powers, for example, 1000 to 10,000 W. The alternator/generator may have a governor to regulate output.

Batteries as used herein, typically are batteries used to power vehicles, most commonly lithium-ion batteries. Batteries as contemplated herein can be one third to one half the size of typical batteries used in electric vehicles due to the extra power generation provided by the hydraulic/pneumatic system.

An electric vehicle as contemplated herein generally includes vehicles for road use, i.e., electric cars, trucks, pickups, vans, etc., as well as larger big rig, semi-truck type vehicles.

While this disclosure includes specific examples, it will be apparent after an understanding of the disclosure of this application has been attained that various changes in form and details may be made in these examples without departing from the spirit and scope of the claims and their equivalents.

The invention claimed is:

1. An electric vehicle comprising an hydraulic/pneumatic electric power generating system comprising:
    a hydraulic power unit in fluid communication with a hydraulic piston comprising a diameter between 3 and 8 inches in a hydraulic cylinder via hydraulic fluid;
    hydraulic pressure applied to the hydraulic piston actuates, via a piston rod, a pneumatic piston, the actuation of the pneumatic piston creates pneumatic pressure in a pneumatic cylinder; the pneumatic pressure then drives a pneumatic motor; and
    the pneumatic motor is configured to operate an alternator, wherein the diameter of the hydraulic piston is smaller than a diameter of the pneumatic piston; and
    a canister air exchange comprising a pipe wrapped perpendicular inside a section of larger pipe configured to create a pressure induced spin movement of the canister air exchange via ball bearings to operate the alternator, and the pneumatic motor is configured to operate the alternator via a belt, chain, or gears;
    wherein the electric vehicle is a passenger automobile, sport utility vehicle, truck, pickup truck, or motorhome.

2. The hydraulic/pneumatic electric power generating system of claim 1, wherein the diameter of the pneumatic piston is two times or more larger than the diameter of the hydraulic piston.

3. The hydraulic/pneumatic electric power generating system of claim 1, wherein the diameter of the pneumatic piston is three times or more larger than the diameter of the hydraulic piston.

\* \* \* \* \*